Aug. 2, 1966 P. LEFFERTS 3,264,572

TRANSIENTLY REGENERATIVE AMPLIFICATION

Filed Feb. 15, 1963 3 Sheets-Sheet 1

INVENTOR.
PETER LEFFERTS
BY
Morgan, Finnegan, Durham & Pine
ATTORNEYS

INVENTOR.
PETER LEEFERTS
BY
Morgan, Finnegan, Durham & Pine
ATTORNEYS

TRANSIENTLY REGENERATIVE AMPLIFICATION

Filed Feb. 15, 1963 3 Sheets-Sheet 3

INVENTOR
PETER LEFFERTS

BY
Morgan, Finnegan, Durham & Pine
ATTORNEYS

United States Patent Office 3,264,572
Patented August 2, 1966

3,264,572
TRANSIENTLY REGENERATIVE AMPLIFICATION

Peter Lefferts, Princeton, N.J., assignor, by mesne assignments, to TIA Electric Company, Laurence Township, N.J., a corporation of New Jersey
Filed Feb. 15, 1963, Ser. No. 258,735
16 Claims. (Cl. 330—26)

This invention relates to signal translating and more particularly to controlled regenerative translating methods and circuits useful for many electronic tasks in a wide variety of fields. By way of illustration the invention will be described in terms of signal amplifying techniques employing certain regeneration control actions.

Regeneration finds wide use in electronic circuits, being attained by extrinsic feedback or through intrinsic negative resistance properties, for the purpose of rendering a circuit completely astable (as in an oscillator); for increasing gain (as in regenerative and super-regenerative receivers) and for rendering a circuit transiently astable (as in switching devices).

In the latter class of components, the circuit for establishing feedback conditions is usually permanently in the overall circuit and is rendered effective by the input signal. Typically, in a bistable device, the input signal is regeneratively reinforced until the circuit is driven to one stable limit, there to remain until another signal of sufficient amplitude arrives to switch the circuit out of this limit, and, again with the aid of regeneration, to drive it to the other limit.

One disadvantage of this circuit is that a relatively large signal is required to upset the stable condition at one limit and to initiate the triggering action which transfers the circuit to the other stable state. This results from the fact that in its stable limit the active regeneration characteristic of the circuit is in effect, terminated. As applied to many circuits this limitation is reflected in a hysteresis characteristic.

To overcome this disadvantage, bistable circuits have been proposed in which through the mechanism of a control signal, the circuit is periodically driven, independent of the input signal, to a condition of astable equilibrium; this is done by rendering it actively regenerative. During this interval the circuit is extremely sensitive and it is during this interval that maximum response to the input signal occurs. Owing to the highly sensitive state of the circuit at this time, the slightest signal amplitude is effective to drive the circuit to the corresponding stable limit. The control signal is then reapplied to return the circuit again to the astable, sensitive condition; if the input signal has not changed, the circuit will thereupon return to its prior stable limit; if it has changed in the proper direction and degree the circuit is driven to the other limit. Thus, in one sense the condition of the input is periodically sampled during intervals of regeneratively-induced high sensitivity.

While a theoretically higher sensitivity is achieved by the foregoing arrangements, the proposed circuits are burdened by a number of significant shortcomings. Frequently the arrangement providing the regeneration control signal adds a good deal of complexity to the overall circuit; in some cases the proposals have involved vacuum tube circuits with their attendant shortcomings and inherent limitations; in many of these circuits the control signal tends to corrupt the input circuit in which event the number of potential applications is limited, or isolating stages are required. This limitation is particularly marked in circuits employing two-terminal translating devices. The latter circuits also suffer from the need to control the energizing potential of the translating device within relatively narrow limits.

A further disadvantage of certain of the circuits heretofore proposed, is that the action which periodically establishes astable equilibrium is dependent on driving or directly controlling the translating, e.g. amplifying device with the effect of limiting the overall system response in accordance with the limits inherent in the translating device itself.

It is accordingly an object of the invention to overcome the aforementioned disadvantages and to provide techniques yielding highly sensitive and rapidly acting translating circuits which in spite of these features are nevertheless characterized by unusual simplicity with its attendant economy, reliability and marked reduction in size.

It is a further object of the invention to provide greatly improved amplification techniques in which extremely small inputs are capable of producing considerably higher level responses in circuits other than bistable types.

It is still a further object of the invention to provide general improvements in sensing circuits including improvements in common mode rejection, stabilization, band pass and gain.

These and other objects and advantages of the invention will be set forth in part hereinafter and in part will be obvious herefrom, or may be learned by practice with the invention, the same being realized and attained by means of the steps, methods, combinations and improvements pointed out in the appended claims.

The invention consists in the novel steps, methods, parts, combinations and improvements herein shown and described.

Serving to illustrate exemplary techniques of the invention are the drawings of which:

FIGURE 1

Figure 1:
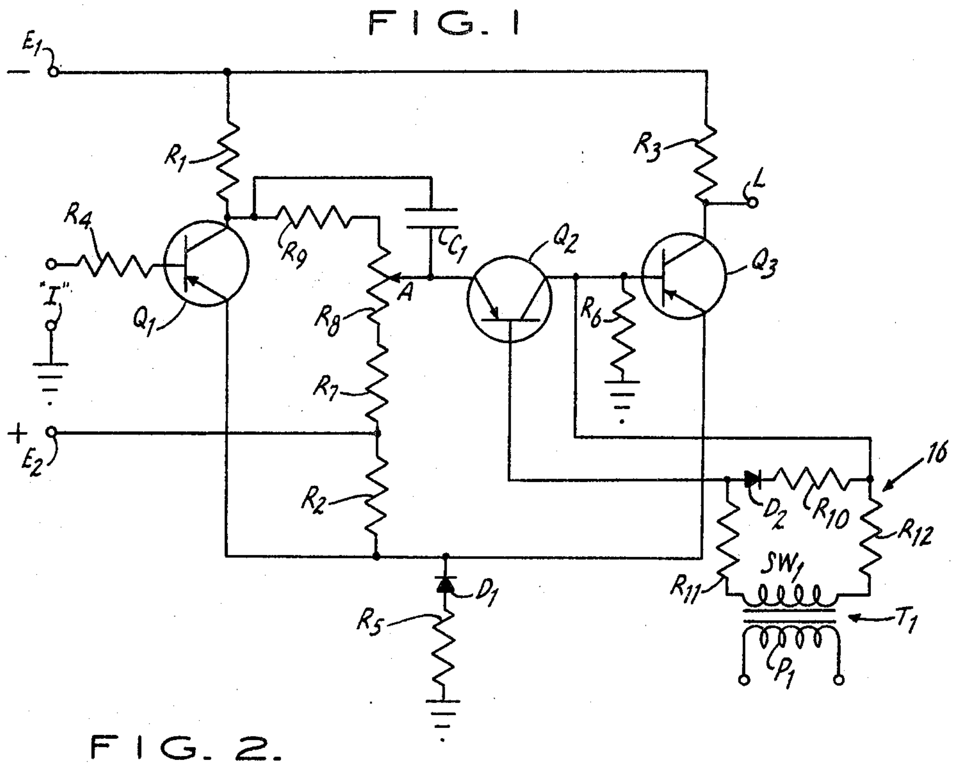
FIGURE 1 is a schematic diagram of a directly coupled, two stage amplifier according to the invention with regeneration control means interposed in the coupling circuit between stages.

In the circuit of FIGURE 1, three transistor stages $Q_1$, $Q_2$ and $Q_3$ are provided. The data flow is generally from input terminal I to $Q_1$ and from $Q_1$ to $Q_3$ via $Q_2$. The output is conveniently provided at terminal L while supply potential is applied to terminals $E_1$ and $E_2$.

The base of transistor $Q_1$ is connected to input terminal I via resistor $R_4$; the collector is connected to source point $E_1$ via $R_1$ while the emitter is connected to potential point $E_2$ via $R_2$. A divider is provided from the collector of $Q_1$ to $E_2$ via serially connected resistors $R_9$, $R_8$ (adjustable) and $R_7$. $R_8$ is adjusted to achieve the requisite quiescent conditions, e.g., balance, by setting its arm A.

Arm A is connected to the emitter of $Q_2$ while the collector thereof is connected to the base of transistor $Q_3$. The latter is returned to ground via $R_6$ while the collector of $Q_3$ is connected to $E_1$ via $R_3$. Illustratively, the output provided at terminal L is taken directly from the collector of $Q_3$ . The emitter of $Q_3$ is connected to the emitter of $Q_1$ and both are connected to ground via diode $D_1$ and resistor $R_5$.

Connected to the base-collector circuit of $Q_2$ is a pulsating voltage source comprising a transformer $T_1$ having a primary $P_1$ adapted to be energized by a variable voltage which may be periodic and is illustratively a square-wave. Serially connected across secondary $SW_1$ are the elements $R_{11}$, $D_2$, $R_{10}$ and $R_{12}$. The base of $Q_2$ is connected to the junction of $R_{11}$ and $D_2$ while the collector is tied to the junction of $R_{10}$ and $R_{12}$.

An input signal applied at terminal I varies the collector voltage of stage $Q_1$. Assuming $Q_2$ to be in the low impedance condition, this variation in collector voltage is coupled via $Q_2$ to the base of $Q_3$. The collector voltage of the latter therefore varies and the corresponding change in emitter current of $Q_3$ varies the potential drop across $R_2$. The circuit connections are such that this drop constitutes positive feedback to stage $Q_1$. Hence the input signal is reinforced, further driving $Q_3$ until saturation or cut off occurs. It is seen that the positive feedback path which includes $R_2$ renders the circuit regenerative and astable such that $Q_3$ will be driven to either of its limits.

The base-collector circuit of $Q_2$ is fed from the pulse source 16 by a relatively constant current during those periods when the pulse across $SW_1$ is of a polarity to back bias $D_2$. During these intervals source 16 drives the collector of $Q_2$ positive with respect to the base whereupon the emitter-collector impedance of $Q_2$ is substantially reduced. During the alternate period of source 16. $Q_2$ is reverse biased by a voltage limited in amplitude through the conduction of $D_2$. Hence, $Q_2$ is effectively an open circuit. Thus $Q_2$ periodically oscillates between conditions of high impedance (cut off) and low impedance (conducting). Since both the collector-to-base coupling and the common emmitter coupling provide the exploited regeneration, the varying impedance of $Q_2$ in one of these couplings periodically permits and then defeats this regeneration. Thus, the circuit of FIGURE 1 is periodically established in the astable and highly regenerative state at which time its sensitivity is maximum. This rate by design is high compared with the input signal and hence the latter is periodically sensed during conditions of maximum sensitivity; in all of the circuits described herein, regeneration is sufficiently high such that the circuit always drives to one limit or the other no matter how small the signal nor how carefully circuit conditions are balanced. During the regenerative intervals the output at L constitutes a highly responsive indication of the input signal at terminal I.

The function of the divider which includes $R_7$, $R_8$ and $R_9$ is to provide at the emitter of $Q_2$, a potential which is nominally very close to the potential of the base of $Q_3$ which in the illustrated circuit is close to ground potential. $R_8$ is adjusted to achieve this nominally balanced condition. It should be noted that according to the polarity of the input signal, $Q_2$ will conduct from emitter to collector or vice-versa, conduction in both directions being attainable by virtue of the driving signal to the collector and base derived from source 16.

The circuit which includes $D_1$ and $R_5$ is energized as a function of the input signal and the base-emitter potential of $Q_1$. During conditions when the input signal is positive and $Q_1$ reverse biased, $D_1$ conducts thereby providing additional current to the emitter-collector of $Q_3$ to increase the output at L. When the input signal is negative $D_1$ is not conducting and is not required since the output at L reaches the value of $E_1$.

FIGURE 2

Figure 2:
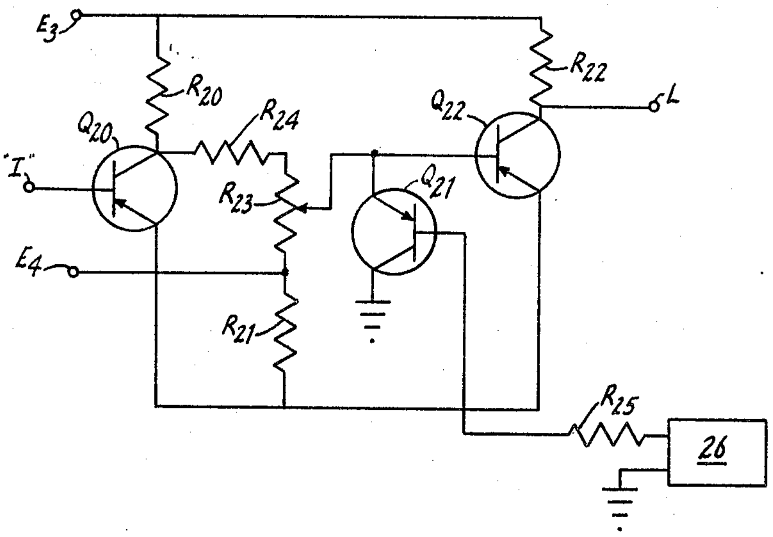
FIGURE 2 is a schematic diagram of a circuit related to the circuit of FIGURE 1 and having an alternate form of regeneration control means.

The circuit of FIGURE 2 is similar in many respects to that of FIGURE 1. The input is coupled via terminal I through transistor $Q_{20}$ to transistor $Q_{22}$. This coupling is effective during intervals when regeneration control transistor $Q_{21}$ is in the high impedance state. The circuit of FIGURE 2 is at this time in a condition of astable equilibrium characterized by extremely high sensitivity.

When, however, $Q_{21}$ is driven to the low impedance condition, the forward transmission path from $Q_{20}$ to $Q_{22}$ is in effect short-circuited or shunted by a low impedance. This interruption in coupling then allows the circuit to be restored to a substantially balanced condition to be followed by the highly sensitive condition as soon as $Q_{21}$ is returned to the high impedance condition. The pulse generator 26 for driving $Q_{21}$ may be generally similar to that of circuit 16 in FIGURE 1.

FIGURE 3

Figure 3:
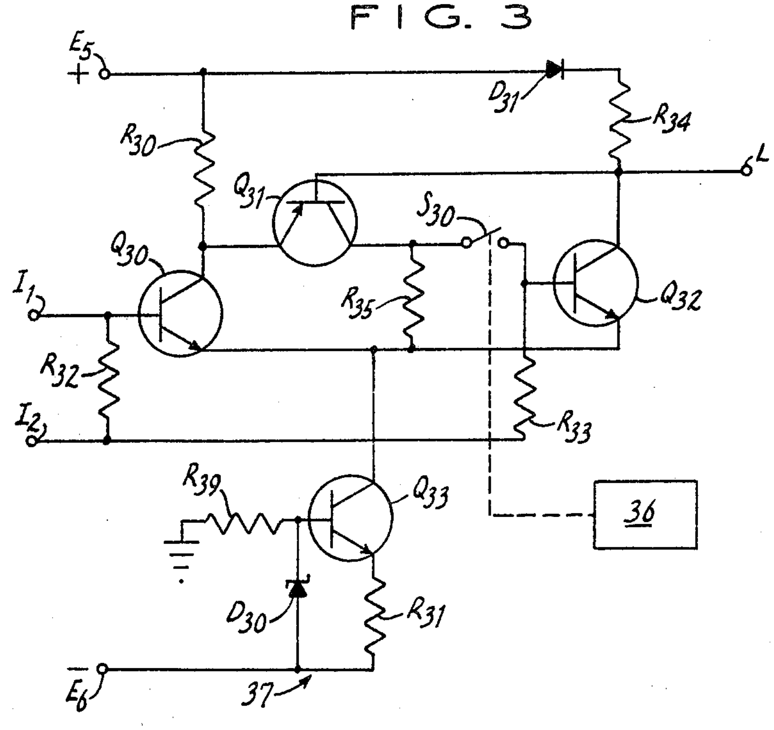
FIGURE 3 is a schematic diagram of a directly coupled, isolated differential amplifier according to the invention with regeneration control means in the coupling between stages.

The circuit of FIGURE 3 receives energizing potentials at points $E_5$, $E_6$ and is designed for differential operation. Inputs are applied at terminals $I_1$ and $I_2$ and the differential signal coupled from $Q_{30}$ to $Q_{32}$ via $Q_{31}$ and the switch $S_{30}$. The output is taken at terminal L, the collector of $Q_{32}$.

Input terminals $I_1$, $I_2$ are connected respectively to the bases of $Q_{30}$ and $Q_{32}$, the former directly and the latter via $R_{33}$. The collector of $Q_{30}$ is connected to source point $E_5$ via $R_{30}$ while the collector of $Q_{32}$ is connected to the same point via the serial combination of $D_{31}$ and $R_{34}$. The diode $D_{31}$ is utilized for temperature compensation of stage $Q_{31}$.

Th emitters of $Q_{30}$ and $Q_{32}$ are connected in common to constant current source 37 comprising transistor $Q_{33}$ having its base connected to ground through $R_{39}$ and to source point $E_6$ via zener diode $D_{30}$. The emitter is likewise connected to $E_6$ via $R_{31}$ while the collector is connected to the emitters of $Q_{30}$ and $Q_{32}$. $R_{39}$ provides breakdown potential for $D_{30}$.

The relatively high impedance of source 37 contributes to the isolation of the input circuit from the common reference point, in this case ground, thus promoting common mode rejection and related advantages.

The emitter and base of stage $Q_{31}$ are connected respectively to the collectors of $Q_{30}$ and $Q_{32}$. The collector of $Q_{31}$ is connected via $R_{35}$ and source 37 to terminal $E_6$ and via switch $S_{30}$ to the base of $Q_{32}$. The function of $R_{35}$ is to maintain $Q_{31}$ conducting during intervals when $S_{30}$ is open.

Switch $S_{30}$ is driven by actuator 36 which may comprise a relay for periodically closing $S_{30}$. Alternately $S_{30}$ and actuator 36 may comprise electronic or other switching means of any convenient type including either of the types illustrated in FIGURES 1, 2. The actuating cycle may include asymmetry between on and off periods and may be aperiodic.

It may be seen that the circuit of FIGURE 3 attains a large measure of input circuit isolation, not only by virtue of source 37 but also because all paths from the input to ground include at least one of the relatively high collector impedances provided by $Q_{30}$, $Q_{31}$, and $Q_{32}$.

The circuit of FIGURE 3 is periodically driven into the astable, highly responsive mode by virtue of $S_{30}$ and actuator 36 and thus exhibits the high sensitivity provided by the circuits hereinbefore described. In the intervals between this highly sensitive period, i.e., when $S_{30}$ is open, the circuit responds to a differential input in a manner generally similar to the operation of known differential amplifiers. When, however, the feedback path becomes effective through the closing of $S_{30}$, the circuit becomes highly astable and thus very sensitive; the unbalanced collector voltages are applied to the base-emitter at $Q_{31}$ and the change in collector voltage of $Q_{31}$ is coupled to the base of $Q_{32}$ causing a greater unbalance which continues virtually instantaneously until $Q_{32}$ is driven to the appropriate limit; $S_{30}$ is subsequently opened by 36 to reset the circuit into a condition of readiness for a new sampling of the input; since the operating frequency of $S_{30}$ is high compared to the input signal, the latter is continuously sampled during highly sensitive intervals to yield high level, rapid responses at the output L.

FIGURE 4

Figure 4:
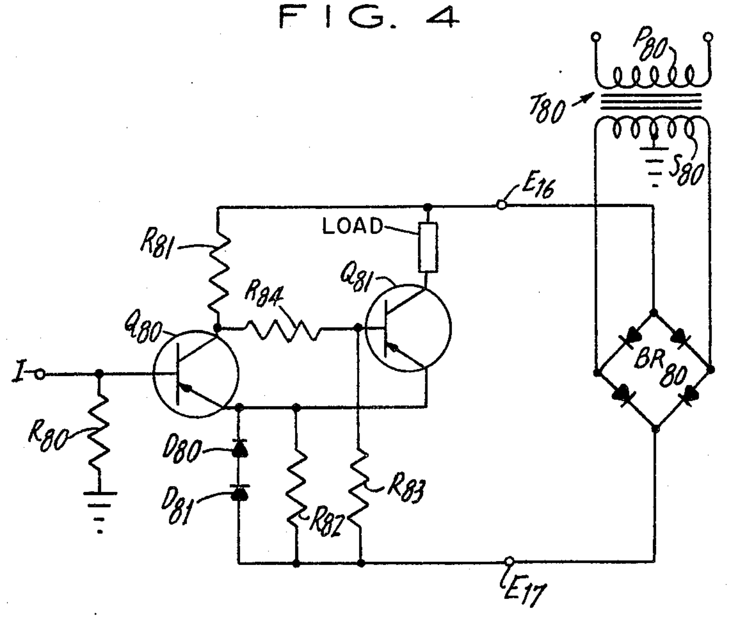
FIGURE 4 is a schematic diagram of a two stage, directly coupled amplifier according to the invention with the regeneration control means embodied in the amplifier supply.

In the circuit of FIGURE 4, control over the periodically-attained regenerative condition is provided by a source of operating potential which yields pulses periodically falling to zero. This may be simply and effectively accomplished by eliminating the filtering elements, in this case, the filter capacitor, customarily provided with the supply; the result is a full wave or half wave rectified operating potential.

In the embodiment of FIGURE 4, the foregoing output is illustratively provided by a full wave rectifier including a transformer $T_{80}$ having a primary $P_{80}$ energized from a convenient, preferably commercial A.C. source, and a grounded center tap secondary $SW_{80}$ which energizes a rectifier bridge $BR_{80}$. The bridge output, which comprises the regeneration control voltage, is applied to terminals $E_{16}$, $E_{17}$ of the illustrated two stage amplifier having directly coupled transistors $Q_{80}$ and $Q_{81}$.

The signal circuit in FIGURE 4 includes input terminal I which is connected to the base of $Q_{80}$ and to ground through $R_{80}$. The emitter of $Q_{80}$ is connected to terminal $E_{17}$ via the series-connected diodes $D_{80}$, $D_{81}$ and to the same point through a resistance $R_{82}$ paralleling $D_{80}$, $D_{81}$. The emitter of $Q_{81}$ is connected to the emitter of $Q_{80}$ and thus the foregoing circuit $R_{82}$, $D_{80}$, $D_{81}$ is common to both stages.

The collectors of $Q_{80}$, $Q_{81}$ are connected to terminal $E_{16}$ by respective impedances $R_{81}$ and the load. The collector of $Q_{80}$ connects to the base of $Q_{81}$ via $R_{84}$; the base of $Q_{81}$ connects to $E_{17}$ via $R_{83}$.

During the period when the bridge output voltage $E_{16}$-$E_{17}$ is of low amplitude, stages $Q_{80}$ and $Q_{81}$ are in their low gain condition notwithstanding the regenerative couplings between stages involving branch $R_{81}$, $R_{84}$, $R_{83}$ and the common emitter resistance $R_{82}$.

Each time the potential $E_{16}$-$E_{17}$ rises, the stages are transferred to their high gain condition and the regenerative, highly sensitive characteristic prevails. This action is facilitated by making $R_{81}$ large compared to the load. During these intervals very small input voltages are sufficient to switch the output stage into the related "on" or "off" limit thereby actuating or deenergizing the load. During "on" intervals an increase in output is obtained because of the conduction of $D_{80}$ and $D_{81}$.

The circuit of FIGURE 4 has the further advantage associated with the circuit of transistors $Q_{80}$, $Q_{81}$ in that once the proper threshold voltage of these devices is reached, their gain and conduction dependency on collector voltage virtually disappears. Thus precise and rapid switching is accomplished. In addition the high collector impedances provide isolation of input and output.

It is noteworthy that in the circuit of FIGURE 4 the sampling period, while preferably smaller than the smallest signal period, is larger than the reset period when the circuit is transferred from the immediately prior state toward a condition of balance.

FIGURE 5

Figure 5:
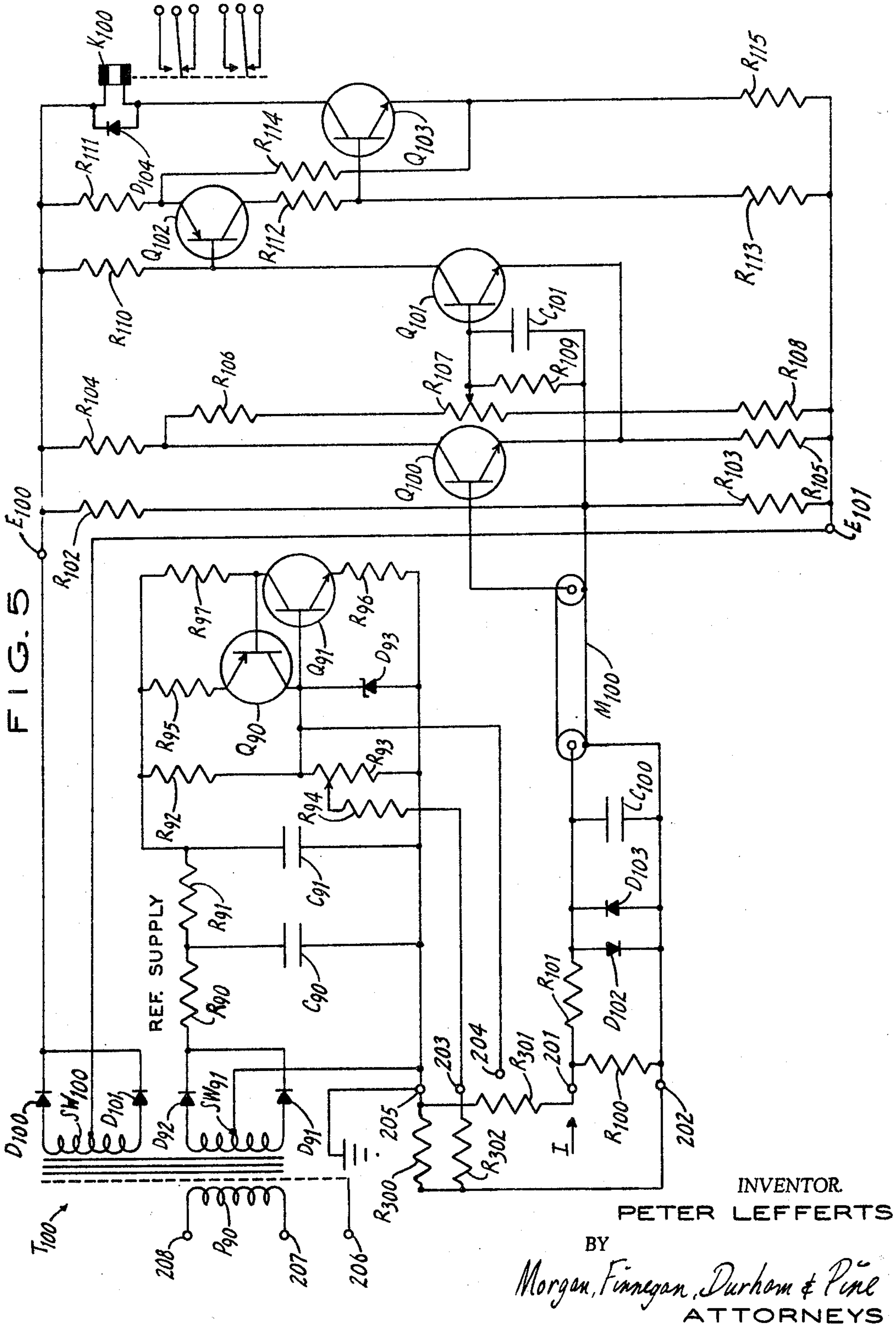
FIGURE 5 is a schematic diagram of a circuit related to the circuit of FIGURE 4 illustrating its adaption to a wide variety of sensing functions.

The circuit of FIGURE 5 is related to the circuit of FIGURE 4 and illustrates an adaption of the invention to a multi-purpose, highly sensitive sensing device. To mention just a few applications, the arrangement of FIGURE 5 may be used, with proper input connections, as a sensitive relay, as a comparator for over-voltage sensing, as a conductivity tester, bridge balance relay, photoresponsive relay and temperature control detector. The input connections in the circuit of FIGURE 5 illustrate a sensitive relay application.

The circuit shown to the left of the terminals 201 through 205 illustrate external connections and resistors which are arranged and adjusted according to the intended application. In the illustrated embodiment, the resistors 300, 301 and 302 have been interconnected with the terminals 201, 202, 203 and 205 in order to provide sensitive relay operation.

Terminals 201 and 202 constitute the input terminals. Terminals 203, 204 and 205 conveniently provide reference potentials derived from a reference supply included in the unit to impart versatility thereto and facilitate a wide variety of applications. The voltage at terminal 203 is adjustable while the voltage between terminals 204 and 205 is fixed. Input power in supplied at terminals 207 and 208, being fed from the commercial power source. The output circuit comprises a relay $K_{100}$ and associated contacts, the latter opening and closing according to the amplitude of the input signal.

The reference supply comprises a full wave rectifier including a secondary winding $SW_{91}$ of a transformer $T_{90}$ and, diodes $D_{91}$ and $D_{92}$. The transformer is energized by way of primary winding $P_{90}$.

Connected across the output terminals of the rectifier in the reference supply is the series combination of a resistor $R_{90}$ and a pi filter comprising $C_{90}$, $R_{91}$ and $C_{91}$. Connected across the output of the pi filter is a divider $R_{92}$ and $R_{93}$. The latter is adjustable and has the potential developed at its arm coupled to terminal 203 via resistor $R_{94}$. The negative side of the reference supply is connected to terminal 205 while the junction of the divider is connected to 204. The voltages appearing at terminals 203, 204 and 205 comprise substantially constant D.C. potentials which are regulated and stabilized by a circuit connected across the divider $R_{92}$, $R_{93}$. This circuit includes a transistor $Q_{90}$ interconnected with another transistor $Q_{91}$.

One branch of the regulating circuit comprises a series combination of resistor $R_{95}$, the emitter-collector of $Q_{90}$, and a zener diode $D_{93}$. A second branch comprises resistor $R_{97}$, the collector-emitter of $Q_{91}$ and a resistor $R_{96}$. The base of $Q_{90}$ is connected to the junction of $R_{97}$ and the collector of $Q_{91}$. The base of $Q_{91}$ is connected to the junction of the collector of $Q_{90}$ and the zener diode $D_{93}$. The foregoing arrangement serves to provide a stabilized potential across resistor $R_{93}$, and hence yields stabilized potentials at the terminals 203 and 204. Thus it may be seen that the potential across $D_{93}$ tends to be constant. Accordingly, the collector current of $Q_{91}$ tends to be constant. The stages $Q_{90}$ and $Q_{91}$ thus interact to produce a constant current through the zener diode $D_{93}$ to stabilize the aforementioned reference potentials.

The input section of the sensing circuit includes $R_{100}$ connected across input terminals 201 and 202. In serial relationship across $R_{100}$ is the series combination of resistor $R_{101}$ and parallel, oppositely-polarized diodes $D_{102}$ and $D_{103}$. Connected in shunt with the diodes is a capacitor $C_{100}$. This input circuit is designed as a noise filter and to prevent damage to the sensing circuit through malfunctions or errors associated with the input circuit. Thus the diodes $D_{102}$ and $D_{103}$ prevent the development of excessive-base-emitter potential in the sensing circuit.

From the input section, the sensed signal is coupled to the base of input stage $Q_{100}$ and to the intermediate point of a divider $R_{102}$ and $R_{103}$. The sensing circuit including the divider is connected across the source comprising secondary winding $SW_{100}$ and diodes $D_{100}$ and $D_{101}$ in full wave configuration. This source produces a pulsating output as noted in connection with the circuit of FIGURE 4. This potential is applied to terminals $E_{100}$ and $E_{101}$ of the sensing circuit.

The collector of $Q_{100}$ is connected to $E_{100}$ via $R_{104}$ while its emitter is connected to $E_{101}$ via $R_{105}$. A divider is provided from the collector to $E_{101}$ and comprises the serial combination $R_{106}$, $R_{107}$ (adjustable) and $R_{108}$. The arm of $R_{107}$ which is set for balancing purposes is connected to the base of the second stage $Q_{101}$. This base is also returned to the input connection at divider $R_{102}$ and $R_{103}$ by way of the parallel combination $R_{109}$ and $C_{101}$. The latter is designed to decouple transients from the regenerative circuit. The emitter of $Q_{101}$ connects to the emitter of $Q_{100}$ while its collector is connected to $E_{100}$ via $R_{110}$.

The circuit thus far described corresponds in certain respects to the circuit of FIGURE 4 and is periodically regenerative. The employment of divider $R_{102}$ and $R_{103}$ provides the additional feature whereby the reference side of the input circuit is connected in effect to the center or zero potential point of the supply $E_{100}$–$E_{101}$. This has the beneficial effect of eliminating the effects of asymmetry, line voltage fluctuation and related conditions.

The circuit as described behaves similar to the circuit of FIGURE 4 so far as basic operation is concerned. When the potential $E_{100}$–$E_{101}$ is low, the circuit is in a low gain state notwithstanding its regenerative characteristic; there is, therefore, negligible response to the signal applied at terminals 201 and 202. When the voltage $E_{100}$ rises, however, the circuit is transformed to its high gain, sensitive state. During this interval the input signal is sensed and produces a related output at the collector of $Q_{101}$.

The stages $Q_{102}$ and $Q_{103}$ are driven by the collector output of stage $Q_{101}$. The function of these latter two stages is to provide power amplification which thereby enables sensing stages $Q_{100}$ and $Q_{101}$ to operate at a relatively low and constant power level. This arrangement mitigates, to a great extent, the temperature compensation problems arising from self-heating.

The base of $Q_{102}$ is connected directly to the collector of $Q_{101}$. The emitter of $Q_{102}$ is connected to $E_{100}$ via $R_{111}$. The emitter also connects to the emitter of stage $Q_{103}$ via $R_{114}$. The collector of $Q_{102}$ connects to $E_{101}$ via the series combination $R_{112}$ and $R_{113}$. The junction of these two is connected to the base of $Q_{103}$.

The emitter of output stage $Q_{103}$ is returned to $E_{101}$ via $R_{115}$. The collector is connected to $E_{100}$ via the output relay $K_{100}$.

The circuit connection which includes $R_{114}$ introduces a regenerative characteristic into the power amplifying stages $Q_{102}$, $Q_{103}$ to enhance their net gain.

In the illustrated sensitive relay application and with the input connections as shown, resistor $R_{93}$ is set to provide a voltage of desired value, say, 0.9 volt at terminal 203. A fraction of this reference voltage, determined by the values of divider resistances $R_{302}$ and $R_{300}$, is applied at input terminal 202. Illustratively, this adjusted reference voltage may be of the value 9 millivolts (positive to ground).

It will be assumed initially that the input at terminal 201 is less than 9 millivolts. Under these conditions, a negative signal voltage is applied to the base of $Q_{100}$. During the highly regenerative periods, this voltage is sensed and tends to reduce conduction of $Q_{100}$. The collector voltage thus rises and the potential across $R_{105}$ due to $Q_{100}$ falls, tending thereby to increase conduction of $Q_{101}$. The regenerative characteristic accentuates this response and $Q_{101}$ is driven to saturation.

Under these conditions, the relatively large potential across $R_{110}$ provides large forward drive to $Q_{102}$ whereby conduction of the latter increases. The resultant increased potential across $R_{113}$ serves to increase forward drive to $Q_{103}$ and the latter is driven very rapidly to saturation whereby $K_{100}$ is energized. This action, which is virtually instantaneous, is abetted by the regeneration effect of $R_{114}$.

All of the foregoing occur in rapid fashion during the sensing interval when the potential $E_{100}$–$E_{101}$ has increased beyond the threshold value. The action is cyclically repeated so long as the input at terminal 201 remains less than 9 millivolts. Diode $D_{104}$ across $K_{100}$ keeps the latter energized notwithstanding the repetitive action, until the input signal changes to a value effective to cause switching.

If the input should change to a value greater than 9 millivolts during the next regenerative period, $Q_{100}$ is turned full on and $Q_{101}$ full off. Thus stages $Q_{102}$ and $Q_{103}$ are cut off and relay $K_{100}$ deenergized. The normally-open contacts close to complete any desired output circuit such as the energizing circuit of a control device or indicator. The normally-closed contacts are opened and may serve related tasks such as performing disabling, transfer and other functions. This switching is effected with a very small change in input, say from 9 millivolts to 10 millivolts. Using a convenient commercial relay, e.g., an Elgin Advance type MV20–120D–31, load currents of two amperes per contact set are switched in response to this small input signal. In the example, power gains of the order of $10^{13}$ are readily obtained. So sensitive is the circuit that care must be exercised in contending with noise and other spurious conditions.

The foregoing description of exemplary embodiments is provided to illustrate various ways of practising the invention in a variety of circuits. Other circuit configurations and applications will undoubtedly occur to those skilled in the art. The invention is, accordingly, not limited to the specific mechanisms shown and described, but departures may be made therefrom within the scope of the accompanying claims without sacrificing its chief advantages or varying from the spirit thereof.

What is claimed is:

1. A highly sensitive signal translating circuit comprising a semiconductor amplifier having two opposite saturated states and including an input and an output,
an input circuit connected to said amplifier input for receiving an electrical parameter to be sensed;
an output circuit connected to said amplifier ouput for providing a response indicative of said electrical parameter;
a positive feedback loop including at least part of said amplifier for, when activated, driving said amplifier into either one of said two opposite saturated states as a function of the polarity of the electrical parameter; and
a feedback control circuit coupled to said positive feedback loop for intermittently activating and deactivating said feedback loop over successive time intervals short compared with the period of said electrical parameter;
whereby said electrical parameter is incrementally sensed to produced a corresponding response in said output circuit.

2. A circuit according to claim 1 further comprising a pulsating power supply coupled to said amplifier and wherein said feedback control circuit comprises said power supply connected so that said positive feedback loop is activated while a pulse is being supplied and deactivated between successive pulses.

3. A circuit according to claim 1 wherein said amplifier comprises at least two separate stages and wherein said feedback control circuit comprises a switching device connected between said stages.

4. A highly sensitive signal translating circuit comprising an amplifier having two opposite saturated states including at least two amplifying stages; an input circuit connected to said amplifier for receiving an input signal to be sensed; an output circuit connected to said amplifier for providing an output signal indicative of said input signal; circuit means coupled between said input circuit and said output circuit for completing a positive feedback loop for, when active, driving said amplifier into either one of said two opposite saturated states in accordance with said input signal polarity; and switching means connected between said amplifying stages for periodically disconnecting said stages to thereby periodically interrupt positive feedback in said amplifier.

5. A translating circuit in accordance with claim 4 wherein said switching means is a semiconductor device connected to couple the output from one of said amplifying stages to the input of the other of said amplifying stages when said switching means is conductive.

6. A translating circuit in accordance with claim 4 wherein said switching means is a semiconductor device operatively connected to, when conductive, effectively decouple said amplifying stages.

7. A highly sensitive translating circuit comprising a semiconductor amplifier including a pair of semiconductor devices each having an emitter; an input circuit responsive to an electrical parameter and coupled to one of said devices; an output circuit coupled to the other one of said devices for providing an output signal related to the polarity of said electrical parameter; circuit means coupled between said devices and periodically operative to interconnect said devices so that the conductive state of one device becomes opposite the conductive state of the other; a common emitter circuit connected to said emitters to regeneratively couple said devices so that conduction of one renders the other nonconductive; and feedback control means connected to said circuit means to periodically interconnect said devices to complete a regenerative loop via said common emitter circuit to drive said semiconductor devices into a saturated state related to the polarity of said electrical parameter, and to periodically impair the operation of said regenerative loop by disconnecting said devices.

8. A translating circuit in accordance with claim 7 wherein said semiconductor devices are transistors each further including a base and a collector; and said circuit means includes a switching device serially connected between the collector of one of said devices and the base of the other device.

9. A translating circuit in accordance with claim 8 wherein said switching device is a transistor.

10. A translating circuit in accordance with claim 7 wherein said semiconductor devices are transistors each further including a base and a collector; and said circuit means is connected between the collector of one of said devices and the base of the other, said circuit means including a switching device connected in shunt relationship to effectively eliminate coupling between said semiconductor devices when said switching device is conductive.

11. A translating circuit in accordance with claim 10 wherein said switching device is a transistor.

12. A highly sensitive translating circuit comprising an amplifier including two semiconductor amplifying elements; an input circuit for receiving an electrical signal to be sensed, said input circuit being connected to both of said amplifying elements; an output circuit for providing a response indicative of the polarity of said input signal and being connected to at least one of said amplifying elements; regenerative coupling circuit means connected to maintain said amplifying elements in opposite saturated states of conductivity when operative; and control means for periodically rendering said regenerative coupling circuit means operative to drive said amplifying elements into a saturated state as a function of the polarity of said electrical signal being sensed.

13. A highly sensitive translating circuit in accordance with claim 12 wherein said amplifying elements are interconnected to form a differential amplifier, said regenerative coupling circuit means is a transistor, and said control means is a switching device for periodically disconnecting said transistor.

14. A highly sensitive translating circuit comprising a saturable amplifier having an input and an output; an input circuit connected to said amplifier input and adapted to receive an input signal to be sensed incrementally; an output circuit connected to said amplifier output for providing a response indicative of the input signal polarity; a regenerative feedback loop including at least part of said amplifier and, when activated, operative to drive said amplifier into a selected one of two saturated states as a function of the input signal polarity; and pulsating power supply means having successive periods of substantially zero voltage connected to said amplifier for so supplying electrical energy to said amplifier that said regenerative feedback loop is periodically activated during power supply pulses and deactivated during said periods of zero voltage.

15. A highly sensitive translating circuit in accordance with claim 14 wherein said amplifier comprises a pair of transistors connected in cascade and said regenerative feedback loop comprises a common emitter circuit for achieving regenerative coupling.

16. A highly sensitive translating circuit comprising an unfiltered power supply consisting of rectifying means supplied from an A.C. source and operative to provide pulsating D.C. energy having periods of substantially zero voltage; an input circuit responsive to an electrical signal; saturable amplifier means having two opposite saturated states and being coupled to said input circuit and energized from said power supply; a regenerative feedback loop including at least part of said amplifier and being operative to drive said amplifier into a saturated state corresponding to the polarity of said electrical signal between said periods of substantially zero voltage, said regenerative feedback loop being interrupted during said periods of substantially zero voltage.

References Cited by the Examiner

UNITED STATES PATENTS

| | | | |
|---|---|---|---|
| 2,596,956 | 5/1952 | Nierman | 317—123 |
| 2,625,650 | 1/1953 | Spencer | 330—112 X |
| 2,647,208 | 7/1953 | De Jager | 328—101 X |
| 2,831,985 | 4/1958 | Eckert | 307—88.5 |
| 2,838,686 | 6/1958 | Eckert | 307—88.5 |
| 2,842,721 | 7/1958 | Atkins | 317—146 |
| 2,927,967 | 3/1960 | Edson | 330—26 X |
| 2,986,707 | 5/1961 | Blecher | 330—86 |
| 3,011,074 | 11/1961 | Feder. | |
| 3,011,129 | 11/1961 | Magleby et al. | 307—88.5 |
| 3,106,684 | 10/1963 | Luik | 330—112 X |
| 3,151,300 | 9/1964 | Pommerening | 330—51 |

ROY LAKE, *Primary Examiner.*

T. M. WEBSTER, R. P. KANANEN, *Assistant Examiners.*